July 2, 1963  H. J. THIELSCH  3,095,844
INERT GAS SEALER
Filed July 24, 1958
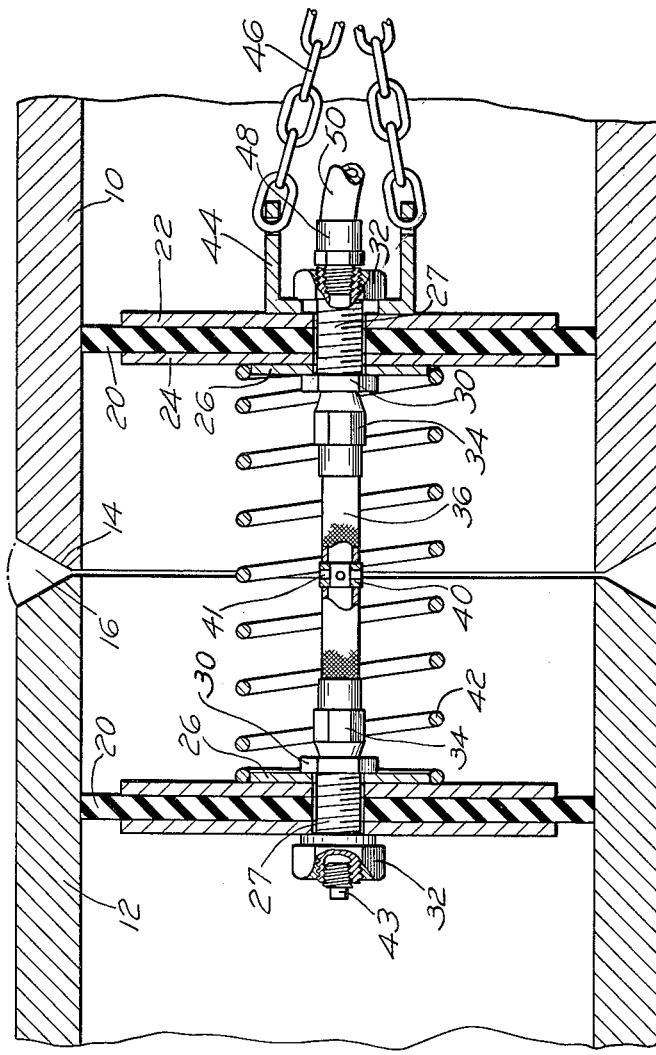
INVENTOR.
HELMUT J. THIELSCH
BY
David D. McKenney
ATTORNEY

United States Patent Office 3,095,844
Patented July 2, 1963

3,095,844
INERT GAS SEALER
Helmut J. Thielsch, Cranston, R.I., assignor to Grinnell Corporation, Providence, R.I., a corporation of Delaware
Filed July 24, 1958, Ser. No. 750,718
1 Claim. (Cl. 113—111)

This invention relates to a device which facilitates the welding together of abutting pipe ends when purging the inside of the pipe with an inert gas.

Whenever pipe ends, or any other metal objects, are welded they perforce become hot. Unless the surrounding atmosphere is made inert, the oxygen therein will combine with either the parent metal, the weld metal, or both with deleterious effect. The process of removing the atmosphere and replacing it with an inert gas which does not combine with the heated metal is known in the art as purging.

The purging device herein disclosed provides a chamber into which an inert gas may be introduced, thus displacing therein the normal atmosphere with its attendant oxygen content. The device displays particular utility in the fabrication of piping networks which include curved pipes. It may easily be drawn through any curves in the system and provides the worker in this art with a simple and inexpensive tool which is oftentimes vital. The device includes two parallel disc assemblies which fit snugly within the pipes, the assemblies being on opposite sides of the pipe junction, and forms a chamber into which an inert gas is introduced.

Referring now to the drawing the numerals 10 and 12 denote adjacent pipe sections which are to be joined together by welding. The pipe ends are usually beveled as indicated at 14, the bevels defining an annular region 16 which is later filled with weld metal.

The numerals 20 denote disc elements formed of rubber or other elastomer material and are sandwiched between smaller metal discs 22 and 24. Still smaller metal discs 26 are located interiorly of discs 24 between discs 20. Elements 20 to 26 are termed disc assemblies. Flanges 30 of interiorly and exteriorly threaded ferrules 27 abut the discs 26 and nuts 32 threaded on the ferrules hold all of the disc elements together. Sleeve elements 34 are threaded to the inner ends of ferrules 27 and carry a length of braided flexible metal tubing 36, the latter at its midsection having an apertured reinforcing collar 40 with orifices 41. A helical coil spring 42 is placed between inner discs 24 and its end whorls are located around discs 26, thus maintaining the axis of the spring substantially coincident with the axis of the tube 36. The free length of the spring is greater than the distance between inner discs 24, maintaining the spring under compression. It will be noted that the diameter of the spring 42 is appreciably greater than that of the tubing 36 in order that it may have a substantial effect in maintaining the discs 20 in parallelism.

At one end of the device a plug 43 is placed in one ferrule 27 to prevent the passage of gas therethrough. At the other end a clevis element 44 to which chain elements 46 are attached is carried. At this same end a hollow ferrule 48 attached to an end of a flexible gas conduucting tube 50 is threaded to a gas input port defined by the hollow ferrule 27.

The device is utilized in the welding of abutting pipe ends by the inert gas purging method as follows. In this description the pipe segment 12 will be considered as a part of a partially completed piping network and the pipe segment 10 will be considered as the next pipe segment which is to be added to the network. The chain elements 46 and tubing 50 are inserted in pipe 10, extending from the device out to the pipe's free end. The device is then inserted in the shown end of the pipe 10 with its left half protruding outwardly approximately half the length of the device. The pipe 10 is now moved towards the pipe 12 and the protruding disc 20 is inserted into the pipe 12, with the end of the pipe 10 now being brought next to pipe 12, as shown. The discs 20 are in parallel relationship, maintained thereby by the spring 42, with the periphery of the elastomer discs 20 fitting snugly against the inside surfaces of the pipes.

An inert gas, such as argon or helium, is now caused to flow through the tubing 50 and passes through orifices 41 of mesh tubing 36 into the chamber defined by interior pipe surfaces and the two disc assemblies. The reader will note that any substantial departure from parallelism would result in leakage from this chamber. The inert gas dispels the atmosphere in the chamber by displacing it through the small clearance (exaggerated for purposes of illustration in the drawing) between the adjacent pipe ends and after a short time the undersides of the adjacent pipe ends are completely exposed to an inert atmosphere. In some instances it may be desirable to place small escape apertures through one or both of the disc assemblies to maintain the pressure of the inert atmosphere at a desired level or to vary it in any desired manner. At the completion of the welding process the whole device is pulled out of the free end of segment 10 by chain elements 46.

The tube 36 is formed of flexible hose covered with metal mesh so that it may withstand the tensile forces on it due to the compression of the coil spring 42. It must further withstand the frictional force between the periphery of the bottom disc and the interior surfaces of the pipes whenever the device is pulled from the completed weld.

The drawing illustrates a purging device wherein each disc assembly has a single elastomer disc 20 which seals the chamber at its ends. Devices may be made however which include more than one elastomer disc for each assembly.

I claim:

An inert gas sealing device for enclosing and substantially sealing adjacent interior portions of two abutting pipe ends during a welding operation on said pipe ends, said device comprising:

A. two spaced, normally parallel and normally coaxial disc assemblies, each assembly comprising:
  (1) two thin flat circuular metal plates spaced from each other in parallel relationship,
  (2) one thin flat circular elastomer disc of larger diameter than said metal plates sandwiched between said plates,
  (3) a threaded ferrule element through the center of each of said assemblies securing each assembly together in firm relation,
    (a) one ferrule being open therethrough, and the other ferrule having a plug therein,
B. a flexible, apertured, hollow metal mesh tube extending between the disc assemblies coincident with their axes and having each end fastened to one of said ferrules,
  (1) one end of said tube communicating through the open ferrule with a gas inlet tube on the side of the disc assembly opposite to the side having the mesh tube,
  (2) the other end of said mesh tube being fastened to the ferrule with the plug therein,
C. a helical coil spring located between said disc assemblies and coaxial therewith about said metal mesh tube,
  (1) said spring having a free length greater than the distance between said disc assemblies, whereby said spring is always under compression and causes said assemblies to constantly seek a parallel relationship and to maintain a desired separation to the extent prescribed by the length of the metal mesh tube, D. means for retaining said spring in said location, and
E. a plurality of chains each having one end joined to the outside of the disc assembly containing the open ferrule for pulling said device to and from its desired position.

References Cited in the file of this patent

UNITED STATES PATENTS

| | | |
|---|---|---|
| 2,177,916 | Thomas et al. | Oct. 31, 1939 |
| 2,461,517 | Carnevale | Feb. 15, 1949 |
| 2,481,013 | Henderson | Sept. 6, 1949 |
| 2,668,511 | Eberle et al. | Feb. 9, 1954 |
| 2,853,773 | Darasko | Sept. 30, 1958 |

FOREIGN PATENTS

| | | |
|---|---|---|
| 618,715 | Great Britain | Feb. 25, 1949 |

OTHER REFERENCES

"Welding Apparatus" (Mueller), 671 O.G. 1498 (June 30, 1953).